April 22, 1924.
C. E. FULLER
1,491,771
LOADING AND UNLOADING APPARATUS
Filed Feb. 18, 1922    3 Sheets-Sheet 1
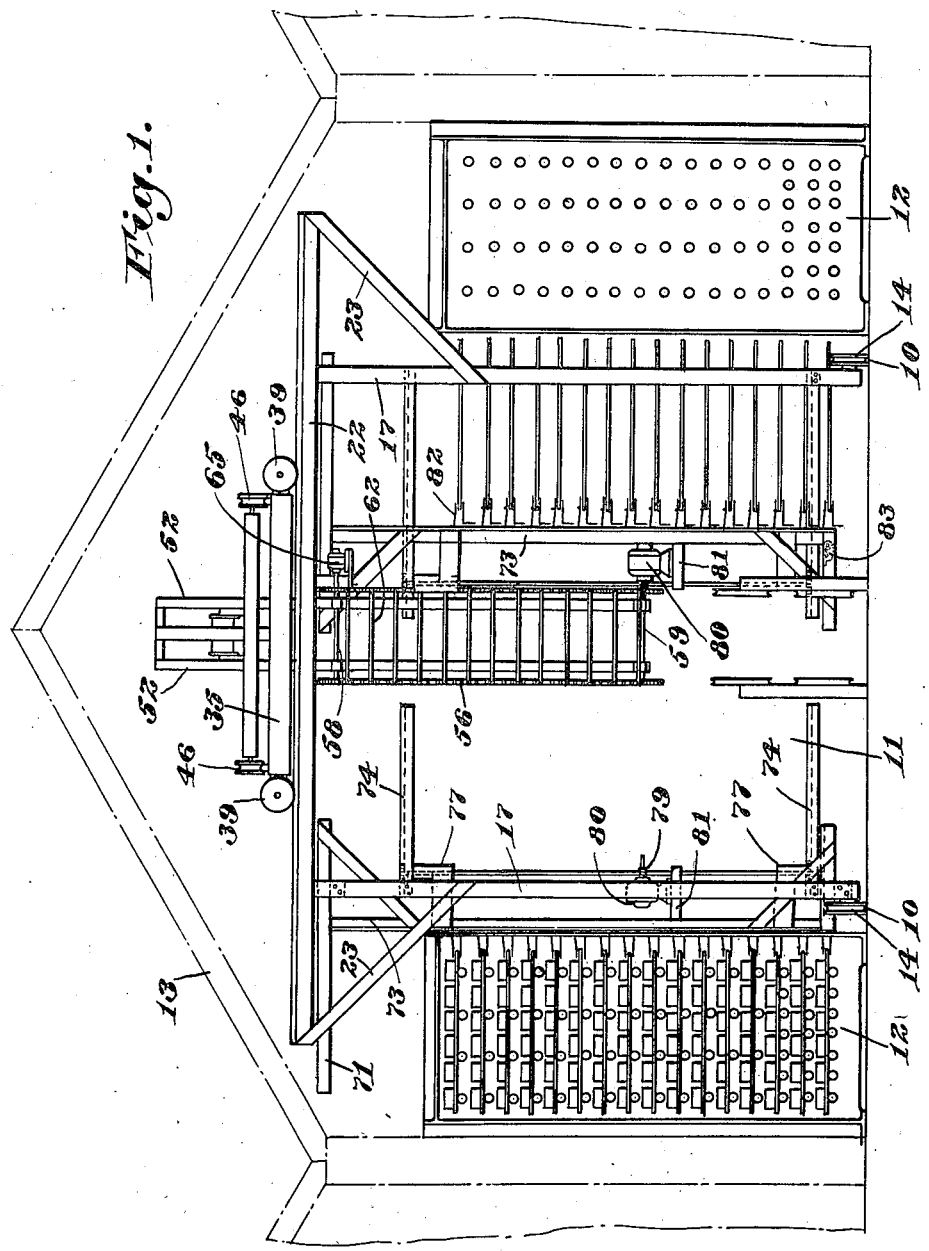
Inventor
Claud E. Fuller
by James R. Hodder
Attorney

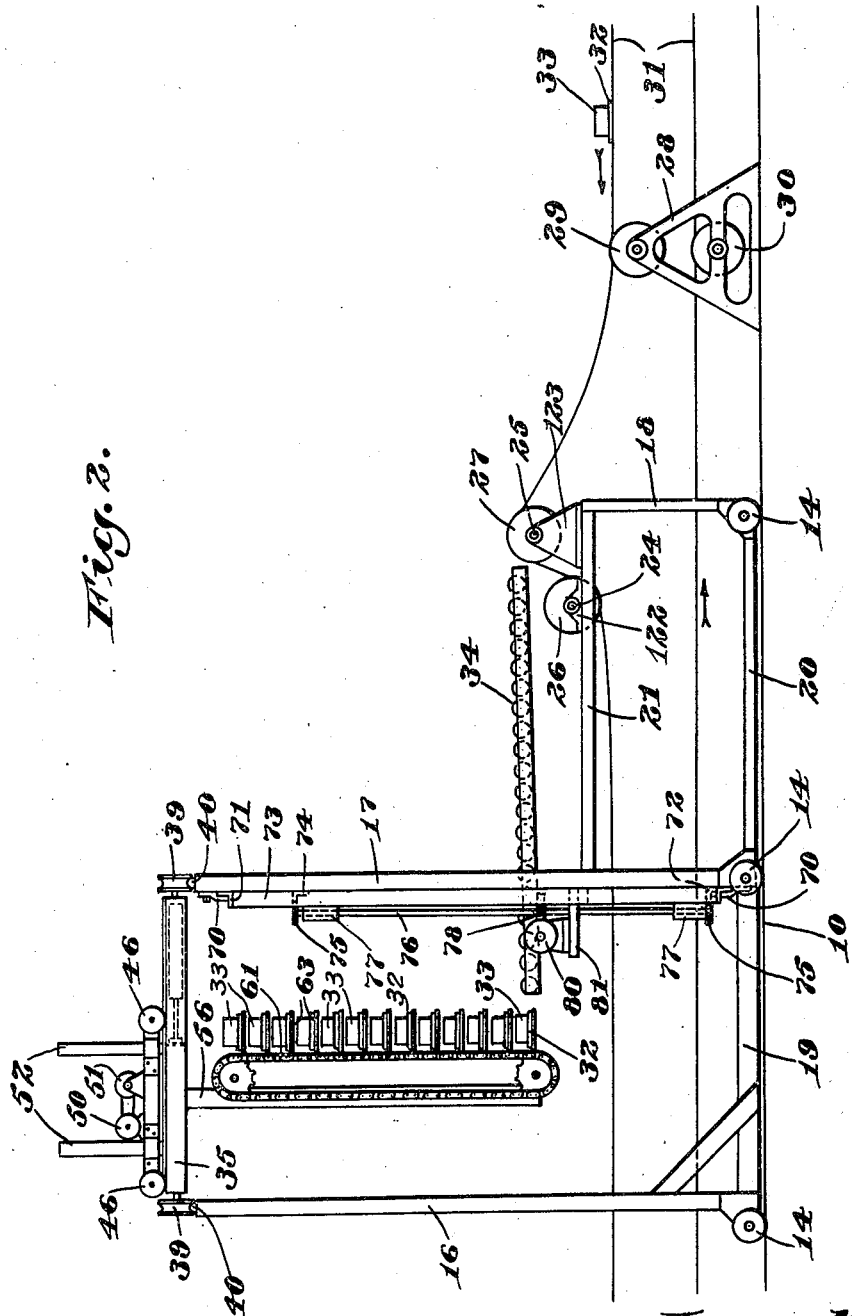

April 22, 1924.
C. E. FULLER
LOADING AND UNLOADING APPARATUS
Filed Feb. 18, 1922   3 Sheets-Sheet 3
1,491,771
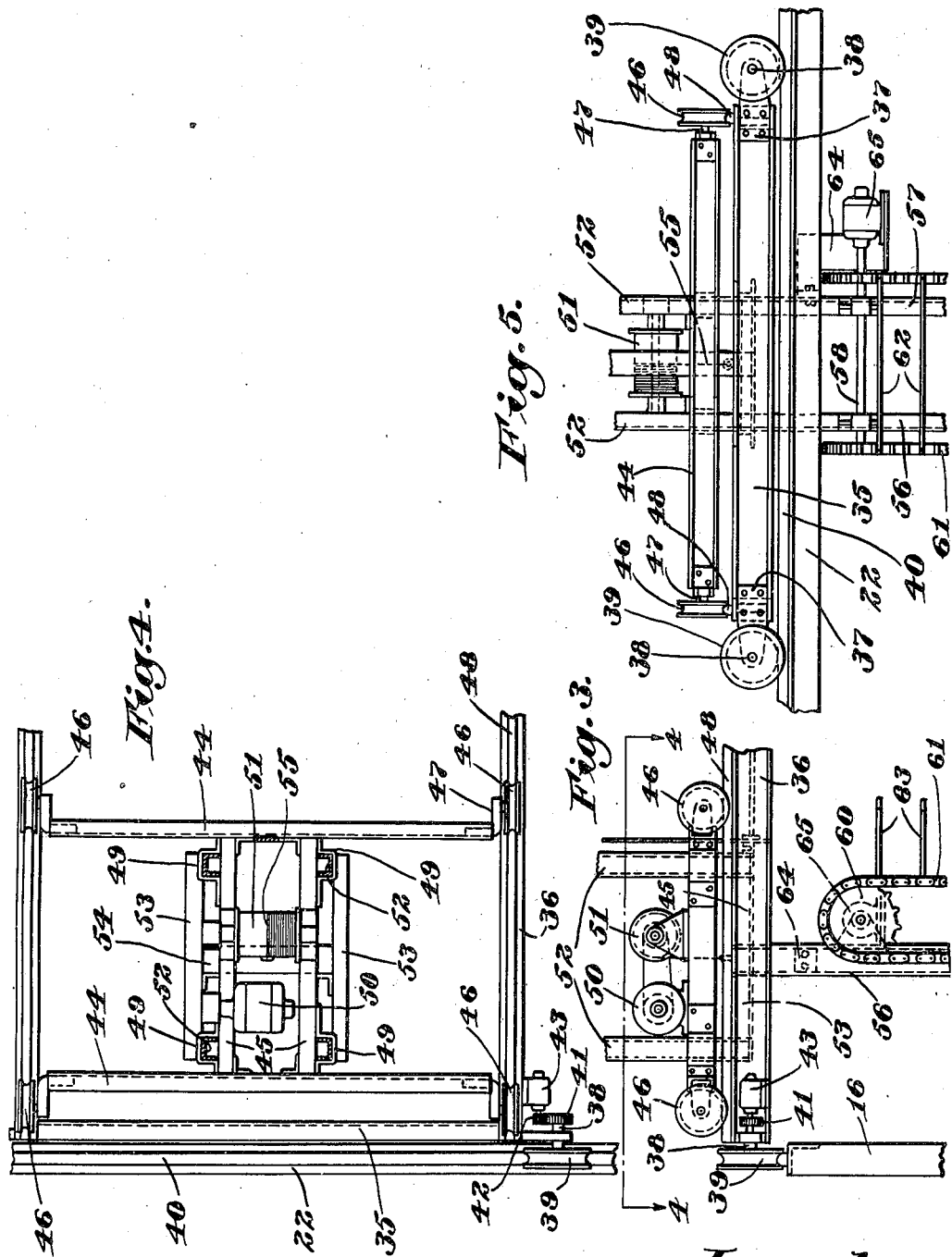

Patented Apr. 22, 1924.

1,491,771

UNITED STATES PATENT OFFICE.

CLAUD E. FULLER, OF NEW YORK, N. Y.

LOADING AND UNLOADING APPARATUS.

Application filed February 18, 1922. Serial No. 537,631.

*To all whom it may concern:*

Be it known that I, CLAUD E. FULLER, a citizen of the United States, and resident of New York, in the county of New York and State of New York, have invented an Improvement in Loading and Unloading Apparatus, of which the following description, in connection with the accompanying drawings, is a specification, like letters on the drawings representing like parts.

My present invention relates to brick making machines, and more particularly to an improved machine for handling green brick arranged on pallets and loading and unloading them into and out of a drying apparatus, such as a pipe rack drier.

The tendency, at the present time, is to eliminate manual labor to as great an extent as possible, and to substitute therefor mechanical devices. Heretofore the greatest difficulty has been experienced in displacing the manual labor employed in taking the green brick off the conveyor leading from the off bearing belt of the brick making machine, and place the loaded pallets carrying the brick into the drier. After the green brick have been dried, manual labor must be employed in removing the loaded pallets from the racks of the drier and hacking them preparatory to placing in the kiln by machinery designed for this purpose. Various machines have been devised for placing the green brick in spaced relation on pallets, and in my present invention I may employ any of such mechanisms. In the description of my present invention, therefore, I do not show or refer to such mechanisms as they do not affect the operation of my improved apparatus. In my present invention, I employ gripping means for simultaneously gripping a plurality of vertically arranged pallets, and for releasing the same, and desire to claim such gripping device as an element of my apparatus, though the specific novel details of the structure of such improved gripping means forms no part of my present invention.

It is essential that the sequence of operations of inserting the loaded pallets into the drier, and unloading the same therefrom, be maintained and carried out in the restricted space allowable in a modern pipe rack drier. To economize space in such modern driers, it is now usual to place parallel series of racks on each side of a narrow passageway, and I have so arranged my improved apparatus as to be capable of cooperating with the racks on each side thereof. With my apparatus I am enabled to dispense with all the labor heretofore deemed necessary to be employed in the drier, with the exception of one operative.

The principal object of my invention therefore, is an improved loading and unloading device for driers and the like.

Another object is an improved apparatus for transferring a group of loaded pallets from a travelling conveyor to a movable carrier.

Still another object is an improved apparatus for simultaneously loading or unloading a plurality of vertically arranged loaded pallets into or out of a pipe rack drier section.

Other objects and novel features of the construction and arrangement of parts will appear as the description of the invention progresses.

In the accompanying drawings,

Fig. 1 is an end elevation of an apparatus embodying my invention, in position in the passageway located between the series of racks in a pipe rack drier, the outline of the drier building being indicated in dot and dash lines;

Fig. 2 is a side elevation of my apparatus;

Fig. 3 is a side elevation of the top portion of my apparatus;

Fig. 4 is a sectional plan view, taken on the line 4—4 of Fig. 3, and

Fig. 5 is a side elevation of Fig. 3.

Referring to the drawings 10 designates rails on either side of and extending lengthwise through a passageway 11 located between series of pipe rack drier sections 12 placed in a drier building 13. On these rails 10 run wheels 14 rotatably mounted at the lower end of a framework composed of side standards 16, 17 and 18, the standards 16 and 17 being tied together by plates 19 and the standards 17 and 18 being tied together by plates 20 and 21. The side standards 16, 17 on either side of the passageway 11 are tied together at their top by a rail plate 22 and braces 23. Secured to the plates 21 are pillow blocks 122, 123, in which are rotatably mounted the shafts 24 and 25 respectively, to which shafts are secured the pulleys 26 and 27 respectively. At any convenient point in the passageway 11 within the building 13, or in alinement with said passageway but outside the building 13, is a horse 28 in which are rotatably mounted pulleys 29 and 30, in alinement with the pulleys 26 and 27. A rope conveyor 31, leading from any convenient loading point, runs in the direction of the arrows shown in Fig. 2, this conveyor passing over the pulleys 29 and 27, under the pulleys 26, to and over end pulleys (not shown), back over pulleys 30, and over other end pulleys (not shown). Adjacent the pulleys 29 and in such a position as to receive pallets 32 carried by the rope conveyor 31, and loaded with green brick 33, is one end of an anti-friction table 34, secured to the standards 17 and with its other end extending to a point intermediate the standards 16 and 17, for a purpose to be hereinafter described.

A rectangular framework comprising side plates 35 and end plates 36 secured together in any suitable manner has riveted to each end of each side plate 35 a plate 37 in which are rotatably mounted a shaft 38 to which is secured a wheel 39 that runs on rails 40 secured to the rail plate 22. To one of said shafts 38 is secured a gear 41 which meshes with and is driven by a pinion 42 secured to the drive shaft of a motor 43 attached to one of the end plates 36.

A framework comprising plates 44 secured to and spaced apart by plates 45 is provided with wheels 46 rotatably mounted on stub shafts 47 secured to the ends of the plates 44, these wheels 46 running on rails 48 secured to the top of the plates 36. At each end of each of the plates 45 is secured a guideway 49, for a purpose to be hereinafter described, and mounted on the plates 45 is a motor 50 for rotating, in either direction, a drum 51 that is mounted in pillow blocks 45 secured to the said plates. U-shaped bars 52, of any convenient length, are slidably mounted in guideways 49, these bars 52 being tied together at their lower ends by members 53 and 54, a cable 55, fastened one to the member 54 and the other to the member or drum 51, holding bars 52 and members 53 and 54 at any height with respect to the mechanisms above described. Secured to the bottom of the member 54 and depending therefrom are members 56 and 57 spaced apart from each other and provided, top and bottom, with rotatably mounted shafts 58 and 59 respectively, having secured to their ends sprocket wheels 60, over which run sprocket chains 61 tied together by cross bars 62 connected to the ends of outwardly extending rods or bars 63 secured to the sprocket chains, these rods or bars 63 being of a length slightly greater than the width of the pallets 32, and the cross bars 62 being spaced apart a sufficient distance to permit a pallet 32 with its load of bricks 33 to rest on the bars 63, as shown in Fig. 2. Mounted on a bracket 64 secured to the member 57 is a motor 65 and by means of which the shaft 58 may be rotated in either direction to cause a movement of the sprocket chains 61, as will be hereinafter described.

Secured near the top and bottom of each side standard 17 are guides 70, in which is slidably mounted a substantially rectangular frame comprised of a top member 71, a bottom member 72, these being tied together by vertical standards 73 at points spaced from the ends of the top and bottom members, this distance being determined by the distance between the pipe racks 12 and the depth of such pipe racks. Secured top and bottom to the vertical standards 73, and lying parallel to the top and bottom members 71 and 72 respectively, are rack members 74 with which mesh gears 75 secured to the upper and lower ends of a shaft 76 rotatably mounted in bearings 77 on one of the standards 17. Intermediate the ends of the shaft 76 is secured a worm wheel 78 with which meshes a worm 79 secured to the shaft of a motor 80 mounted on a bracket 81 on the standard 17. Rotation of the shaft of the motor 80 in either direction will cause a movement to the right or left, as the case may be, of the frame just described, reference being had in this connection to the showing in Fig. 1. Secured to each of the vertical standards 73 on the side thereof adjacent the pipe rack sections 12, is a plurality of pallet gripping devices 82, such devices being spaced apart a distance equal to the distance between horizontal rows of pipe in the pipe rack sections 12, that is, equal to the distance between the extending rods 63 attached to the sprocket chains 61, a foot treadle 83 on each end, or side, of the frame just described being added to simultaneously operate the vertical row of gripping devices 82.

In the operation of my improved apparatus, it is assumed that green brick 33, or other clay articles, have been placed in position on a pallet 32, and such loaded pallets placed on the rope conveyor 31, which moves in the direction of the arrows shown in Fig. 2. As the loaded pallet passes over the pulleys 27 it is directed onto the roller table 34, over which it moves by gravity. The operator controls the motor 65 to rotate the shaft 58 and move the sprocket chains 61 in such a direction as to bring the uppermost extending bars or rods 63 shown in Figs. 2, into the position now occupied by the lowermost extending bars or rods 63 in said figure. As the loaded pallet 32 leaves the roller table 34 in its movement, it drops into and is positioned on the uppermost extending bars or rods 63, whereupon the operator controls the motor 65 to bring the next set of bars or rods 63 into receiving position, these operations being continued until the bars or rods 63 are fully loaded. Movement of the conveyor 31 is stopped in any convenient manner by the operator, who, by properly controlling the motors 43 and 50, moves the loaded pallets suspended from the bars 56 and 57 into position with regard to the horizontal series of pipes in one or the other of the pipe rack sections 12; that is, with one end of each of the vertical bank of pallets 32 resting on the pipe of each series nearest the passageway 11. The motor 80 is now controlled to bring the gripping devices 82, on the proper upright standard 72, into position with respect to the other ends of the pallets 32, the foot treadle 83 operated to cause the gripping devices 82 to grip such pallets. Motors 43 and 50 are again operated to move the extending bars or rods 63 from engagement with the pallets 32, leaving the same supported by the pipes and gripping devices 82. Motor 80 is operated to move the upright standard 73 in such a manner as to force the loaded pallets 32 into the position shown in Fig. 1. The above sequence of operations is repeated until the drying apparatus is fully loaded, but one operator being required to operate the loading mechanism. Assuming now that the green bricks, or other clay articles, have been sufficiently dried, the sequence of operations above described is reversed; that is, the gripping devices 82 are utilized to withdraw the loaded pallets from the pipe rack sections onto the bars or rods 63, which are then brought into position over the conveyor and moved in such a manner as to deposit the pallets onto the conveyor 31 which carries them to the kiln to be stacked and burned, or to a hacking machine.

While I have shown and described the preferred embodiment of my invention somewhat in detail, it is to be understood that I may vary the size, shape, and arrangement of parts comprising my apparatus within wide limits without departing from the spirit of the invention.

Having thus described my invention, what I claim as new, is:—

1. An improved loading device for placing a plurality of loaded pallets in position in a drier comprising, pallet conveying means, means for receiving a plurality of loaded pallets from said conveying means and arranging them in a vertical bank, means for transporting said loaded receiving means to any point in a drier, and means for gripping the ends of such loaded pallets and placing them in position in the drier.

2. An improved loading device for placing a plurality of loaded pallets in position in a drier comprising, pallet conveying means, means for receiving a plurality of loaded pallets, an anti-friction receiving table interposed between the conveyor and receiving means, operating means for moving the receiving means to receive loaded pallets from the anti-friction table and arranging them in a vertical bank, means for transporting said loaded receiving means to any point in a drier, and means for gripping the ends of such loaded pallets and placing them in position in the drier.

3. An improved loading device for placing a plurality of loaded pallets in position in a drier comprising, a movable frame, a conveyor associated therewith, an anti-friction receiving table mounted on the frame and associated with the conveyor, an endless chain conveyor suspended from the frame and provided with a plurality of pallet receiving bars, means for moving said endless chain conveyor to receive a plurality of loaded pallets from the anti-friction table and arrange them in a vertical bank, and means for gripping the ends of such loaded pallets and placing them in position in the drier.

4. In an improved loading device, the combination of a movable frame, a second frame mounted on and movable transversely of said first frame, a third frame mounted on and movable longitudinally of said second frame, whereby said third frame is movable to any point within the limits of said first frame, a hoisting device mounted on said third frame, an endless chain conveyor mounted on said hoisting device, and means for moving the endless chain conveyor.

5. In an improved loading device, the combination of a movable frame, a second frame slidably mounted on said movable frame, means for moving said second frame transversely of the movable frame, gripping devices mounted at each side of said second frame, and means for operating said gripping devices.

6. In an improved loading device, the combination of a movable frame, a second frame slidably mounted on said movable frame, means for moving said second frame transversely of the movable frame, a plurality of gripping devices mounted at each side of said second frame, and means for simultaneously operating the plurality of gripping devices at either side of said second frame.

In testimony whereof, I have signed my name to this specification.

CLAUD E. FULLER.